United States Patent
Domhan

(10) Patent No.: US 10,228,076 B2
(45) Date of Patent: Mar. 12, 2019

(54) ELECTRICAL DETERMINING OF CHARACTERISTIC VALUES OF MAGNETIC SWITCH VALVES

(71) Applicant: Robert Bosch GmbH, Stuttgart (DE)

(72) Inventor: Michael Domhan, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/535,788

(22) PCT Filed: Oct. 27, 2015

(86) PCT No.: PCT/EP2015/074882
§ 371 (c)(1),
(2) Date: Jun. 14, 2017

(87) PCT Pub. No.: WO2016/096211
PCT Pub. Date: Jun. 23, 2016

(65) Prior Publication Data
US 2017/0350534 A1    Dec. 7, 2017

(30) Foreign Application Priority Data

Dec. 18, 2014   (DE) .................. 10 2014 226 505

(51) Int. Cl.
*G01R 19/25*     (2006.01)
*G01R 27/28*     (2006.01)
(Continued)

(52) U.S. Cl.
CPC ...... *F16K 37/0041* (2013.01); *F16K 31/0675* (2013.01); *F16K 31/0686* (2013.01);
(Continued)

(58) Field of Classification Search
CPC .......... F16K 37/00; F16K 31/06; G01R 19/25; G01R 27/28; H01H 47/04; H01H 47/18; H01H 47/32; G01N 27/00
See application file for complete search history.

(56) References Cited

U.S. PATENT DOCUMENTS

2007/0222427 A1* 9/2007 Takeuchi ............. G01R 31/043
324/71.2
2014/0069390 A1  3/2014 Nishimura et al.

FOREIGN PATENT DOCUMENTS

CN   1832877 A   9/2006
CN   1950711 A   4/2007
(Continued)

OTHER PUBLICATIONS

International Search Report for Application No. PCT/EP2015/074882 dated Mar. 14, 2016 (English Translation, 3 pages).

*Primary Examiner* — Neel D Shah
(74) *Attorney, Agent, or Firm* — Michael Best & Friedrich LLP

(57) ABSTRACT

The invention relates to a method for determining a characteristic value of a magnetic switch valve. The magnetic switch valve can be switched from a closed switch state into an open switch state, via the movement of a rotor by means of a switching magnet applied with current against a conservative restoring force. According to the invention, during the switching of the switch valve from the open state into the closed state, the time course of the current flowing through the switching magnet and/or of the voltage at the switching magnet is measured. The characteristic value to be measured is evaluated from this time course. It was recognized that every movement of the rotor against the switching magnet induced a voltage in same. Now the voltage at the switching magnet is regulated at a constant value, for one, the voltage induced by the movement can be observed as a control (Continued)

deviation in the short term. For another, the induced voltage causes a current flow through the switching magnets. Based on this, the kinematics of the rotor can be deduced. Given that the switching magnet has an ohmic resistance, energy is also dissipated via the current flow. This energy is the key to determining the switching path covered by the rotor when switching between the closed and the open state. The invention also relates to a measuring device that is particularly suitable for the method.

10 Claims, 4 Drawing Sheets

(51) Int. Cl.
*H01H 47/04* (2006.01)
*H01H 47/18* (2006.01)
*H01H 47/32* (2006.01)
*G01N 27/00* (2006.01)
*F16K 37/00* (2006.01)
*H01F 7/18* (2006.01)
*F16K 31/06* (2006.01)
*F02D 41/20* (2006.01)

(52) U.S. Cl.
CPC ....... *F16K 37/0083* (2013.01); *H01F 7/1844* (2013.01); *F02D 41/20* (2013.01); *F02D 2041/2041* (2013.01); *F02D 2041/2051* (2013.01); *F02D 2041/2055* (2013.01); *F02D 2041/2058* (2013.01); *F02D 2041/2093* (2013.01); *H01F 2007/185* (2013.01)

(56) References Cited

FOREIGN PATENT DOCUMENTS

| | | |
|---|---|---|
| DE | 3730523 | 3/1989 |
| DE | 102007031552 | 1/2009 |
| WO | 2005009815 | 2/2005 |
| WO | 2008031656 | 3/2008 |

* cited by examiner

ELECTRICAL DETERMINING OF CHARACTERISTIC VALUES OF MAGNETIC SWITCH VALVES

BACKGROUND OF THE INVENTION

The present invention relates to a device and a method determining a characteristic value of a magnetic switch valve by electrical means.

A magnetic switch valve is opened by means of a switch magnet to which current is applied moving a movable switch element (rotor) against a restoring force. The valve is closed again by interrupting the application of current to the switch magnet. The rotor then falls back to the initial position thereof.

Particularly in the case of fast switching valves of this kind, it is necessary to precisely set the switching path of the rotor. The control speed and the robustness of the valves can only be simultaneously optimized by a precise setting of the switching path. Control speed and robustness have opposite requirements: mechanical switching paths that are as small as possible are necessary for high control speed, wherein a certain minimum switching path my not be undershot in order to prevent throttling effects. The speed, with which the rotor returns when closing the valve into the initial position thereof also increases when the switching path increases. Upon reaching the end position large forces now act which can damage the sealing surface of the valve. On the other hand, a large switching path makes the valve robust against effects which reduce the switching path, for example deposits and coatings. Furthermore, the flow volume increases with an increasing switching path in the open state of the valve.

The basis for each optimization of the switching path is that said switching path is known. The rotor is however not accessible for a mechanical or optical measurement of the switching path in the operationally ready state of the valve. The problem is circumvented by estimating the switching path from the time that it takes the switch valve to move from the one to the other end position or by measuring the magnetic flux. The estimation from the time measurement can be strongly distorted by friction or hydraulic tackiness. In order to be able to infer the switching path from the measurement of the magnetic flux, detailed knowledge of the magnetic circuit and the rotor is necessary.

Further important characteristic values, which change with longer use of a valve and therefore should be monitored, are the spring constants of the restoring force and the friction coefficient effective during the valve actuation. These characteristic values also are not accessible to date by any sufficiently precise measurement in the operationally ready state of the valve.

SUMMARY OF THE INVENTION

It is therefore the aim of the invention to provide a method and a device, with which method the aforementioned characteristic values can be determined more precisely and/or instrumentally more simply than according to the prior art to date.

The invention relates to a method for determining a characteristic value of a magnetic switch valve. The magnetic switch valve can be switched from a closed switch state into an open switch state, via the movement of a rotor by means of a switching magnet applied with current against a conservative restoring force. The invention functions completely analogously on a switch valve, which can be switched via the movement of the rotor against the restoring force of an open switch state into a closed switch state.

The characteristic value belongs to a group which comprises:
the required time for the switching of the switch valve from the open switch state into the closed switch state,
the spring constant of the restoring force,
the friction coefficient effective during the valve actuation and
the switching path which the rotor travels when transitioning between the closed and the open state.

According to the invention, during the switching of the switch valve from the open state into the closed state, the time course of the current flowing through the switching magnet and/or of the voltage at the switching magnet is measured. The characteristic value to be measured is evaluated from this time course.

It was recognized that every movement of the rotor against the switching magnet induced a voltage in same. If the voltage at the switching magnet is regulated at a constant value, for one, the voltage induced by the movement can be observed as a control deviation in the short term. For another, the induced voltage causes a current flow through the switching magnet. Based on both signals, the kinematics of the rotor can be deduced. Given that the switching magnet has an ohmic resistance, energy is also dissipated via the current flow.

This energy is the key to determining the switching path covered by the rotor when switching between the closed and open state. If the valve is closed and thus energy dissipates as a result of the voltage induced at the switching magnet, a source must exist for this energy. This source is the potential energy which was stored during the previous switching from the closed into the open state by means of the mechanical work against the restoring force. Via the force law of the restoring force, a value of the switching path is clearly associated with this amount of energy. The restoring force can, for example, be a spring force but also a gravitational force acting on the rotor. Thus, in a particularly advantageous configuration of the invention, the potential energy, which is stored when switching from the closed into the open state by means of the mechanical work against the restoring force and which is converted into electrical energy when switching from the open into the closed state by the movement of the rotor against the switching magnet and is dissipated at the ohmic resistor of said switching magnet, is evaluated from the time course of the current and/or the voltage.

To this end, a knowledge of the ohmic resistor of the switching magnet is required. This resistance value is therefore advantageously additionally measured. According to the invention, this resistance value is however is a variable that does not or changes only slowly during the long-term operation. It is therefore sufficient to measure this resistance value in the sense of a recalibration in large time intervals.

The evaluation is performed in the simplest manner if, when switching the switch valve from the open into the closed state, the time course of the current flowing through the switching magnet is measured while controlling the voltage at the switching magnet to a constant value. This is particularly true if this voltage is adjusted to zero, for example by the switching magnet being short-circuited. The energy sought is then immediately available by the product of a squared current divided by the ohmic resistance of the switching magnet with this resistance being integrated over the closing process of the switch valve. Another voltage other than zero volts can, however, also be adjusted at the switching magnet or an active control of the voltage can be entirely eliminated, for example by not closing the switch valve by means of a time course of the voltage at the switching magnet but by specifying a time course of the current caused by the switching magnet. The energy ascertained by integration is then to be corrected by the integral of the product of current and voltage at the switching magnet in the same temporal limitations of the closing process.

The movement of the rotor against the switching magnet primarily induces a voltage signal. Only the ohmic resistor of the switching magnet allows here for a measurable current. The accuracy of the measurement is improved if the time course of the voltage is additionally measured and used for determining the sought characteristic value when switching from the open into the closed state.

It is necessary for some configurations of the evaluation to know the current required for switching the valve from the closed state into the open state or the voltage required for this switch. Therefore, this current or respectively this voltage is advantageously measured. An evaluation can, for example, be made from the time course of the current and/or the voltage when switching the valve from the closed into the open state. In one or both of these time courses, a control deviation or a break can, for example, appear upon achieving the current value at which the valve switches.

Upon opening the valve by passing current through the switching magnet, energy is not only stored by means of the mechanical work against the restoring force in the valve. A much smaller amount of energy is independently stored from the presence of a restoring force in the magnetic circuit formed by the rotor and the switching magnet. This energy too is dissipated when closing the valve at the ohmic resistor of the switching magnet. The switching path can be more accurately determined from the entire dissipated energy if the energy proportion that has been allotted to the magnetic circuit is known. To this end, the temporal attenuation course is determined in a particularly advantageous configuration of the invention, with which the energy stored in the magnetic circuit consisting of rotor and switching magnet is dissipated at a fixedly held position of the rotor in the open and/or closed state. For the sake of a simpler evaluation, this attenuation course is advantageously determined using the boundary condition that the switching magnet is short-circuited or that the voltage at the switching magnet is controlled to a constant value.

The attenuation course with which the energy stored in the magnetic circuit is dissipated when the rotor is in a fixedly held position in the open state can be advantageously determined by means of an extrapolation of the time course of the current through the switching magnet. The basis for the extrapolation is the time period in which current was already interrupted from passing through the switching magnet, the rotor, however, not yet being set in motion by the restoring force.

The temporal attenuation course with which the energy stored in the magnetic circuit is dissipated when the rotor is in a fixedly held position in the closed state can be determined by means of a curve fit to the time course of the current through the switching magnet and/or the time course of the voltage at the switching magnet. In so doing, it must be taken into account that the rotor does not immediately achieve the closed end position thereof once and for all when the valve is being closed but repeatedly bounces at this end position. Because the acceleration acting on the rotor is maximal at the moment of the bounce, the voltage induced in the switching magnet and therefore the current flowing through said magnet take on a local maximum. Because the magnetic energy in the closed state is what matters, the curve fit is placed at the maxima which can be induced during the course of the current flowing through the switching magnet and/or of the voltage at the switching magnet when switching into the closed state as a result of the repeated bouncing of the rotor at the end position thereof.

Alternatively or in combination, the temporal attenuation course, with which the energy stored in the magnetic circuit is dissipated when the rotor is in a fixedly held position in the closed state, can advantageously be determined by a separate measurement. In so doing, the attenuation course is determined from the temporal current response of the switching magnet to a voltage applied in the closed state, which is not sufficient for switching into the open state. The features of the magnetic circuit, which go into this attenuation course, are also variables that slowly change or do not change at all during a long-term operation. It is therefore sufficient to carry out this measurement only once or even in the sense of a recalibration at large temporal intervals.

The potential energy stored as a result of the mechanical work against the restoring force can be advantageously extracted from the total dissipated amount of energy at the ohmic resistor of the switching magnet by said energy being evaluated as an integral over the attenuation course for the open state of the rotor between a first point in time, at which the rotor begins to move when switching from the open into the closed state by means of the effect of the restoring force, and a second point in time, at which the rotor during this switching operation first strikes at the end position thereof.

Alternatively or in combination thereto, the potential energy stored by means of the work against the restoring force can be extracted for the same purpose by said energy being evaluated as an integral over the measured current course and/or voltage course between a first point in time, at which the rotor begins to move as a result of the effect of the restoring force when switching from the open into the closed state, and a second point in time, at which the measured current course or respectively the measured voltage course has the same current value or voltage value as the attenuation course for the closed state at the first point in time.

In a particularly advantageous configuration of the invention, the point in time, at which the time course of the current through the switching magnet and/or of the time course of the voltage at the switching magnet achieves a local maximum after the beginning of the switching from the open into the closed state, is evaluated as a point in time at which the rotor strikes the end position thereof.

In a further particularly advantageous configuration of the invention, that point in time at which the rotor induces a voltage or respectively current signal in the switching magnet is evaluated as point in time $t_1$, at which the rotor begins to move by means of the effect of the restoring force when switching from the open into the closed state.

In this way, the time required time for switching the switch valve from the open switch state into the closed switch state can be directly determined. This in turn is the basis for determining the coefficient of friction that is effective during the valve actuation: this friction dampens the repeated striking of the rotor at the end position thereof until said rotor finally remains there. The friction can be evaluated from the damping curve of the maxima in the current through the switching magnet or respectively in the voltage at the switching magnet, which result from this repeated striking. The information with regard to the size of the friction lies substantially in the decrease in amplitude from one maximum to the next.

The information about the spring constant of the restoring force is also contained in the same damping curve: it lies in the time difference between the individual maxima.

Provided only the damping curve is of interest, the current through the switching magnet can alternatively be controlled to a constant value instead of the voltage at the switching magnet during the switching of the switch valve from the open into the closed state. The time course of the voltage at the switching magnet can, for example, then be used as the damping curve during the switching operation. Alternatively, the control deviation of the current control can also be used as the damping curve.

The voltage/current profile predetermined when opening and closing the valve can basically be varied in a variety of ways. The switching magnet can, for example, be symmetrically or periodically actuated. A series of measurements can, for example, be performed by means of a periodic actuation, over which an average is then made. Provided that the temporal current response of the switching magnet to a voltage, which is not sufficient for switching into the open state, is determined after the closing of the valve, a defined, freely selectable pause time can elapse before this measurement. As a result, it can be ensured that the repeated bouncing of the rotor at the end position thereof has definitely concluded.

The ohmic resistance of the switching magnet can, for example, be determined by the voltage applied to the switching magnet and the current flowing through the same being determined in the static open state of said valve. The voltage does not have to be measured directly at the switching magnet or respectively controlled to a constant value. Instead, this can, for example, also occur at the clamping voltage at the power supply outlet. The ohmic resistance of the switching magnet used in the further evaluation also then contains the resistance of the supply line between power supply and switching magnet.

The back calculation of the energy dissipated in the switching magnet to the switching path does not necessarily have to take place via the spring constant of the restoring force. Alternatively, the back calculation to the switching path can be performed via other variables, for example via the observation of the magnetic flux in the air gap between the valve member and the core of the switching magnet.

The invention also relates to a device for determining characteristic values of a magnetic switch valve, which can be switched from a closed switch state into an open switch state, via the movement of a rotor by means of a switching magnet applied with current against a conservative restoring force.

According to the invention, this device comprises the following components:
- a driver unit for applying a voltage or current profile to the switching magnet, said voltage or current profile switching the valve from the open switch state into the closed switch state;
- a measuring instrument for measuring the time course of the current flowing through the switching magnet and/or of the voltage at the switching magnet during the closing process, and
- an evaluation unit which is capable of extracting a characteristic value of the magnetic switch valve from this time course.

According to what was previously stated, this time course contains information about a plurality of characteristic values of magnetic switch valve because the movement of the rotor against the switching magnet induces in the same a voltage as well as a current flow. Thus, the kinematics of the rotor can be deduced from the time course of the current and/or the voltage.

In a particularly advantageous manner, the evaluation unit is capable of extracting a characteristic value from the time course of the current and/or the voltage from a group, wherein this group comprises:
- the time required for switching the switch valve from the open switch state into the closed switch state,
- the spring constant of the restoring force (4),
- the coefficient of friction effective during the valve actuation and
- the switching path (AH), which the rotor (2) covers during the transition between the closed (A) and the open (B) state.

On the one hand, these are particularly important characteristic values of magnetic switch valves. On the other hand, precisely these values can be extracted particularly well from the time course of the current and/or the voltage.

In this way, the coefficient of friction effective during the valve actuation can, for example, be very insightfully determined: the rotor is repeatedly struck in the end position thereof when closing the valve until said rotor finally ultimately remains there. This movement is damped by the friction. The damping curve of the maxima in the current through the switching magnet and/or in the voltage at the switching magnet, which arise as a result of the repeated striking, contains firstly information about the size of the friction in the decrease in amplitude from a maximum.

The damping curve further contains information about the spring constant of the restoring force in the time difference between the individual maxima.

In a very advantageous manner, the evaluation unit is capable of extracting the point in time, at which the rotor is set into motion during the closing process, and/or the point in time, at which the rotor achieves the end position thereof in the closed switch state, for the time course of the current and/or the voltage. This information already delivers a portion of said characteristic values and is a good indicator for changes in the switching characteristics of the valve in the course of time. It can also be used to detect deviations in a serial examination of nominally identical switch valves.

In a very advantageous manner, the evaluation unit is capable of extracting the point in time at which the rotor is set into motion during the closing process as well as the point in time at which the rotor reaches the end position thereof in the closed switch state from the time course of the current (I) and/or the voltage (U). The time required for the switching process and thus the switching speed is then known. This is a very important characteristic value for magnetic switch valves.

To this end, it is particularly advantageous if the device in a further configuration of the invention comprises a further measuring instrument for measuring the time course of the voltage applied to the switching magnet during the closing process or respectively the time course of the current flowing through the switching magnet. The evaluation unit then receives the time course of the current as well as the time course of the voltage as an input. The point in time at which the rotor begins to move by means of the restoring force during the closing process can be particularly well determined precisely from the time course of the voltage. The rotor initially induces a relatively weak signal in the switching magnet, which is primarily a voltage signal and is to be most precisely detected as such, on account of the initially low speed relative to the switching magnet.

In a particularly advantageous configuration of the invention, the evaluation unit has an integrator for the time course of the voltage applied to the switching magnet and/or for the time course of the current flowing through said switching magnet. The dissipated energy during the closing process, which had been stored as a result of the mechanical work against the restoring force in the valve during the previous opening of the valve, can then be measured. This energy can, for example, be converted for the restoring force into the switching path (AH) of the valve with the aid of the force law.

All of the disclosure provided for the method can also be applied to the device and vice versa.

Further measures that improve the invention are described below in detail together with the description of the preferred exemplary embodiments of the invention.

DETAILED DESCRIPTION

Figure 1:
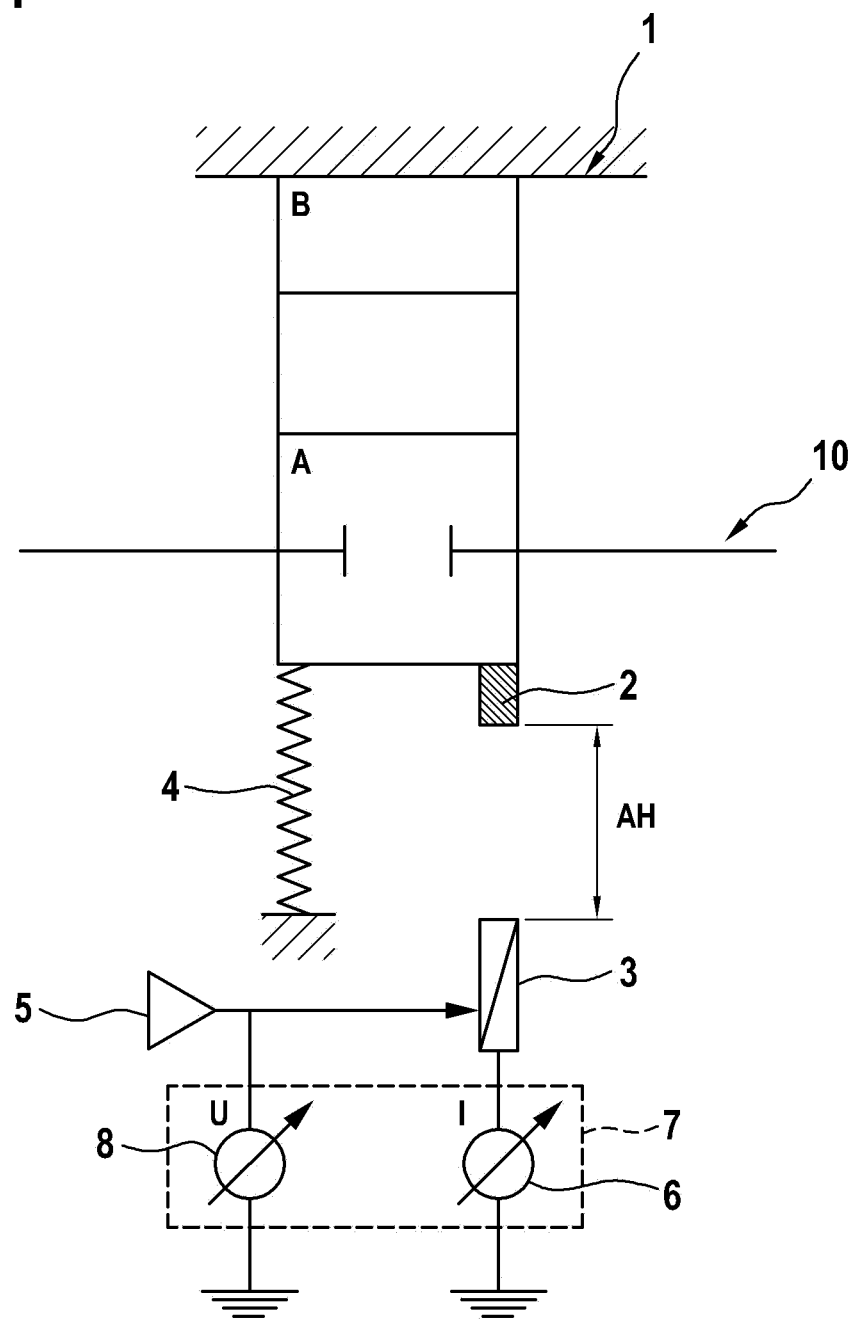
FIG. 1 shows an exemplary embodiment of the device according to the invention.

FIG. 1 shows an exemplary embodiment of the device according to the invention. The magnetic switch valve 1 blocks a line 10 here in the closed switch state A; in the open switch state B enables the flow through the line, 10. The switch valve 1 is controlled by a rotor 2, which can be pulled by means of an energized switching magnet 3 against the force of a spring 4 from the closed switch state A into the open switch state B. In so doing, the rotor 2 covers the switching path (rotor stroke) AH.

A universal power supply having selectable voltage or current specification is provided as a driver unit 5. This driver unit 5 is capable of applying a voltage course or a current course to the switching magnet 3, which switches the valve 1 from the open switch state B into the closed switch state A.

Furthermore, a digital ammeter 6 for measuring the current flowing the switching magnet 3 and a digital volt meter 8 for measuring the voltage applied to the switching magnet are provided. The digital outputs of both instruments are supplied to a measuring computer, which functions as an evaluation unit 7 and in each case plots the time course. The measuring computer is equipped with a software, which determines the points in time at which the rotor 2 is set into motion during the closing process and at which said rotor strikes in the end position thereof in the closed switch state A. Thus, the spring constant of the restoring force 4, the coefficient of friction during the valve actuation and the time required for closing the valve 1 are known. The software can also numerically integrate the time course of the voltage U and/or the current; thus enabling the rotor stroke to be determined.

The device is therefore a compact measuring place, with which all important characteristic values of magnetic switch valve can be determined.

Figure 2:
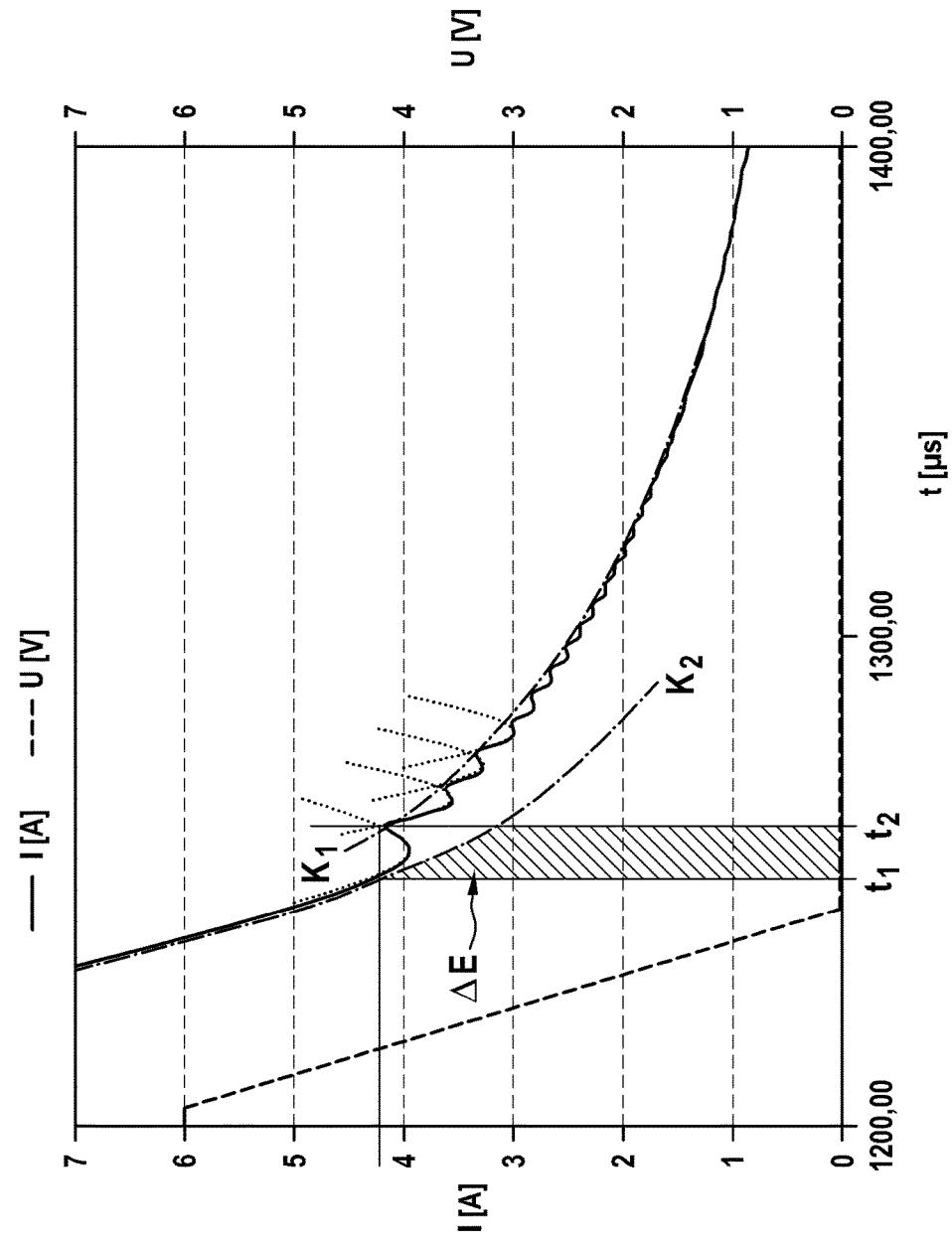
FIG. 2 shows the determination of the switching path using attenuation courses, which are fit to the measured time course of the current through the switching magnet.

FIG. 2 shows the determination of the switching path AH according to one exemplary embodiment of the method according to the invention. A voltage was applied to the switching magnet 3 according to a time profile that is reflected by the curve U. The voltage was in each case consistently controlled to a target value. The measured time course of the current through the switching magnet is indicated in curve I. At the beginning of the measurement a constant abruptly reduced to 0. The voltage actually applied to the magnet 3 indicated by the curve U could thereupon naturally only react with a final flank steepness. After that, the current I through the magnet 3 fell almost linearly until the rotor 2 began to move as a result of the effect of the restoring force 4, which manifested itself in a turning point in the current curve I. The curve $K_1$ is fitted in the region before the turning point. The curve $K_1$ indicates the temporal attenuation course, with which the energy stored in the magnetic circuit consisting of rotor 2 and switching magnet 3 is dissipated during the fixedly held position of the rotor 2 in the open state.

As a result of the movement of the rotor 2 against the switching magnet 3, an additional voltage and therefore also an additional current were induced through the switching magnet. This led to the fact that the drop in the current through the switching magnet 3 initially flattened out until it finally even reversed into an increase. At the point in time, as the rotor 2 first struck in the end position thereof, the acceleration acting on said rotor and therefore also the induced current were the greatest. This is shown by a local maximum in the current curve I at the point in time $t_2$. The point in time $t_1$, at which the rotor 2 begins to set itself in motion due to the effect of the restoring force, was determined as the point in time, at which the curve $K_1$ had the same current value as the curve $K_2$ at the point in time $t_2$ of the first local maximum. The integral $$\Delta E = \int_{t_1}^{t_2} R_{MV} K_1^2 dt$$

concerning the curve $K_1$ between the times $t_1$ and $t_2$ was evaluated as the amount of energy, which had been stored as potential energy by carrying out mechanical work against the restoring force 4. The restoring force 4 was supplied in this exemplary embodiment by a conventional valve spring.

The determined amount of energy $\Delta E$ was converted via the force law for springs into the switching path (rotor stroke) AH in order to have compressed the spring when opening the valve. This is the difference $$AH = s_1 - s_0$$

between the entire tensioning distance $s_1$ of the spring if the valve member is at the upper stop and the pre-tensioning distance $s_0$ of the valve during installation. The following applies:

$$s_1 = \sqrt{\frac{2 \cdot E_{ges}}{D}}, \text{ where } E_{ges} = E_0 + \Delta E$$

wherein $E_0$ is the energy in the, if applicable, pre-tensioned spring.

Because the pre-tensioning force of the fast switching magnetic valves are adjusted very precisely according to the prior art, The energy $E_0$ according to the equation:

$$E_0 = \frac{1}{2} \cdot D \cdot s_0^2$$

is very well known. D denotes the spring constant of the valve spring, which is likewise very exactly known.

The following equation therefore applies to switch valves with and without pre-tensioning by a spring:

$$AH = \frac{F0}{D2} + \sqrt{\frac{F0}{D}} + \frac{R}{D}\int_{t1}^{t2} I^2 dt$$

where
- I . . . measured current
- D . . . spring constant of the spring
- F . . . pre-tensioning force of the spring The sought switching path (rotor stroke) can clearly be determined from the measured variable I and the variables D and $F_0$ known from the construction and the assembly of the valve.

After the first strike in the end position, the rotor 2 springs once again back in order to subsequently in each case again reach this end position, which in turn led in each case to a further local maximum in the current curve I. Between the point in time $t_1$ and the point in time, at which the rotor 2 finally assumes its rest position, the current I runs approximately piecewise parabolic, wherein a new parabola begins after each local maximum. Some of these parabolas are plotted in FIG. 2 as dotted lines.

Figure 3:
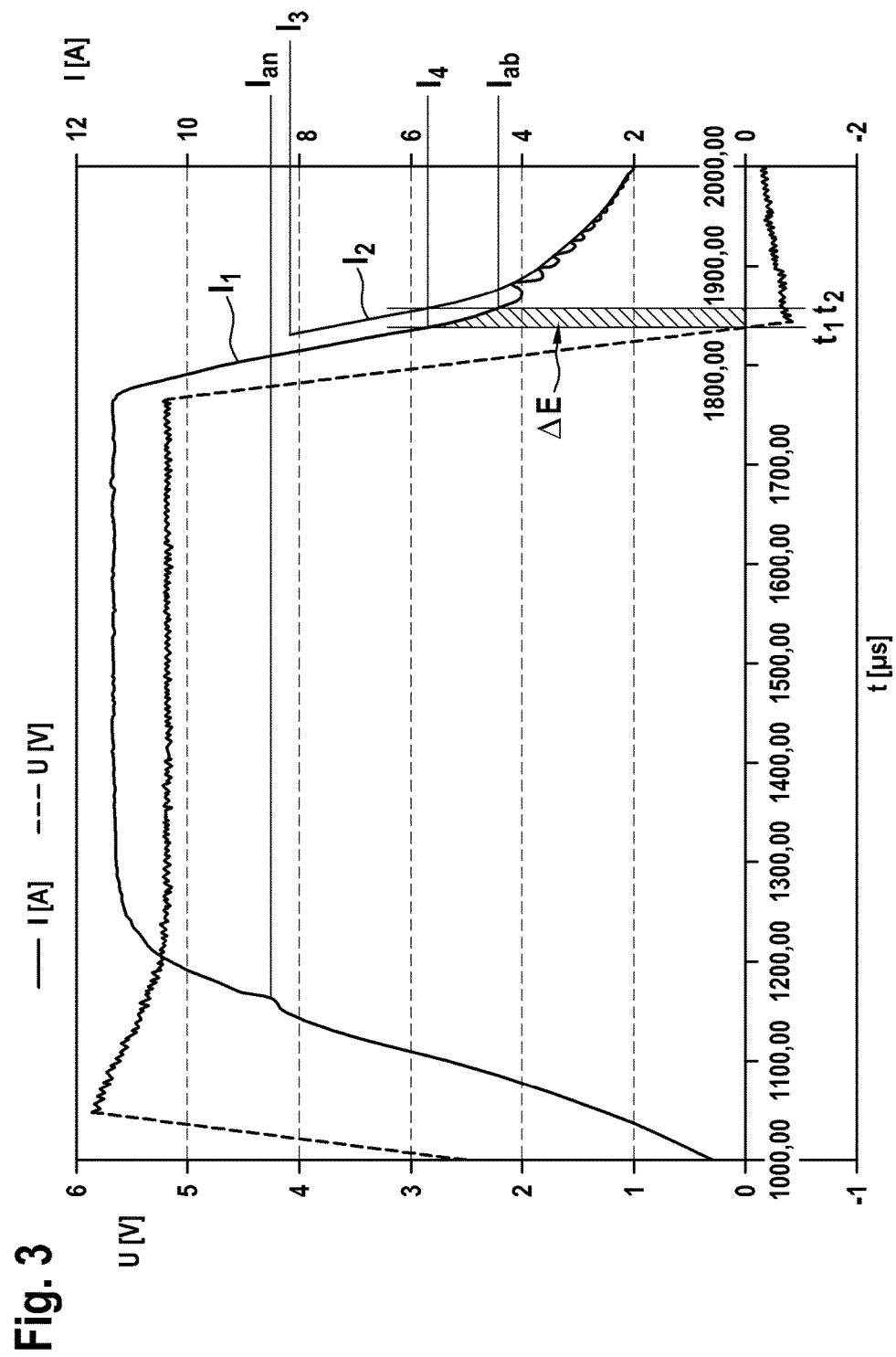
FIG. 3 shows the determination of the switching path using an attenuation course separately measured after closing the valve.

FIG. 3 shows the determination of the switching path AH using a further exemplary embodiment of the method according to the invention, which dispenses with the fitting of curves to the measured current course through the switching magnet. In the diagram, the voltage U at the switching magnet, the measured current $I_1$ flowing through the switching magnet 3 as well as a current $I_2$ measured after the closing of the valve 1 for determining the attenuation course of the magnetic circuit in the closed state are plotted.

The voltage curve 3 begins with a steep ascent in the direction of the target value predetermined at the voltage control. Said curve overshoots the target value before it remains constant on this target value. The current through the switching magnet 3 lags temporally behind the applied voltage due to the inductance of the coil. The valve 1 is initially still in the closed state. As soon as the current through the switching magnet 3 is sufficient to draw the rotor 2 into the open position, a buckling occurs in the current curve $I_1$. The current value, whereat this occurs, is denoted with $I_{an}$. Voltage U and current I remain constant for a certain amount of time. The ohmic resistance was determined from the quotient $U/I_1$. Subsequently, the target value for the voltage at the switching magnet was reduced from 3 to 0. The actual voltage U reacted subsequently with a final flank steepness. Along with the voltage at the switching magnet 3, the current $I_1$ flowing through the switching magnet 3 also dropped. $I_1$ was not initially sufficient to hold the valve 1 open. At a point in time $t_2$, the restoring force 4 first prevailed over the remaining holding force of the switching magnet 3, and the rotor 2 began to move in the direction of the closed position. This point in time can be seen in FIG. 3 in the voltage curve as a small control deviation. This control deviation is superimposed in FIG. 3 by means of an overshoot that the voltage U carries out beyond the target value 0 thereof into the negative area.

Analogous to FIG. 2, several local maxima appear in the measured current $I_1$ in FIG. 3, which were caused by the fact that the rotor 2 repeatedly struck against the closed end position thereof. After the rotor 2 finally had reached the end position thereof, the feed of the switching magnet 3 was switched to current control and a current value $I_3$ was set, which lay below the current value $I_{an}$ for opening the valve 1. The actually flowing current was plotted starting from the right edge of the diagram in the current curve $I_2$, wherein progression was made in the rearward direction on the time axis. The curve $I_2$ is the temporal current response of the switching magnet 3 to a voltage that is applied in the closed state of the valve 1 and is not sufficient to switch into the open state. Said curve $I_2$ was evaluated as an attenuation course with which the energy stored in the magnetic circuit consisting of rotor 2 and switching magnet 3 is dissipated when the rotor 2 is in a fixedly held position in the closed state.

The potential energy $\Delta E$ stored by means of the mechanical work against the restoring force 4 was now evaluated as an integral via the measured current $I_1$.

$$|\Delta E| = \int_{t1}^{t2} R_{MV} I_1^2 dt$$

The right integration limit is the point in time $t_2$, at which the rotor 2 began the motion in the direction of the closed position. The left integration limit $t_1$ is the point in time at which the measured current $I_1$ has the same current value $I_4$ as the attenuation curve $I_3$ at the point in time $t_2$. The area under the curve $I_1$, which corresponds to the amount of energy $\Delta E$ determined in this manner, is depicted shaded in FIG. 3. Analogous to FIG. 2, the switching path AH was determined on this amount of energy $\Delta E$, around which switching path the spring had been compressed during the opening of the valve.

If the voltage $U_{inj}$ at the injector of the switching magnet 3 in the time period between $t_1$ and $t_2$ is not 0 volts, the formula stated above for calculating the energy difference $\Delta E$ is to be corrected as follows:

$$\Delta E = \int_{t1}^{t2} U_{inj} \cdot I_1 dt - \int_{t1}^{t2} R_{MV} \cdot I_1^2 dt$$

Figure 4:
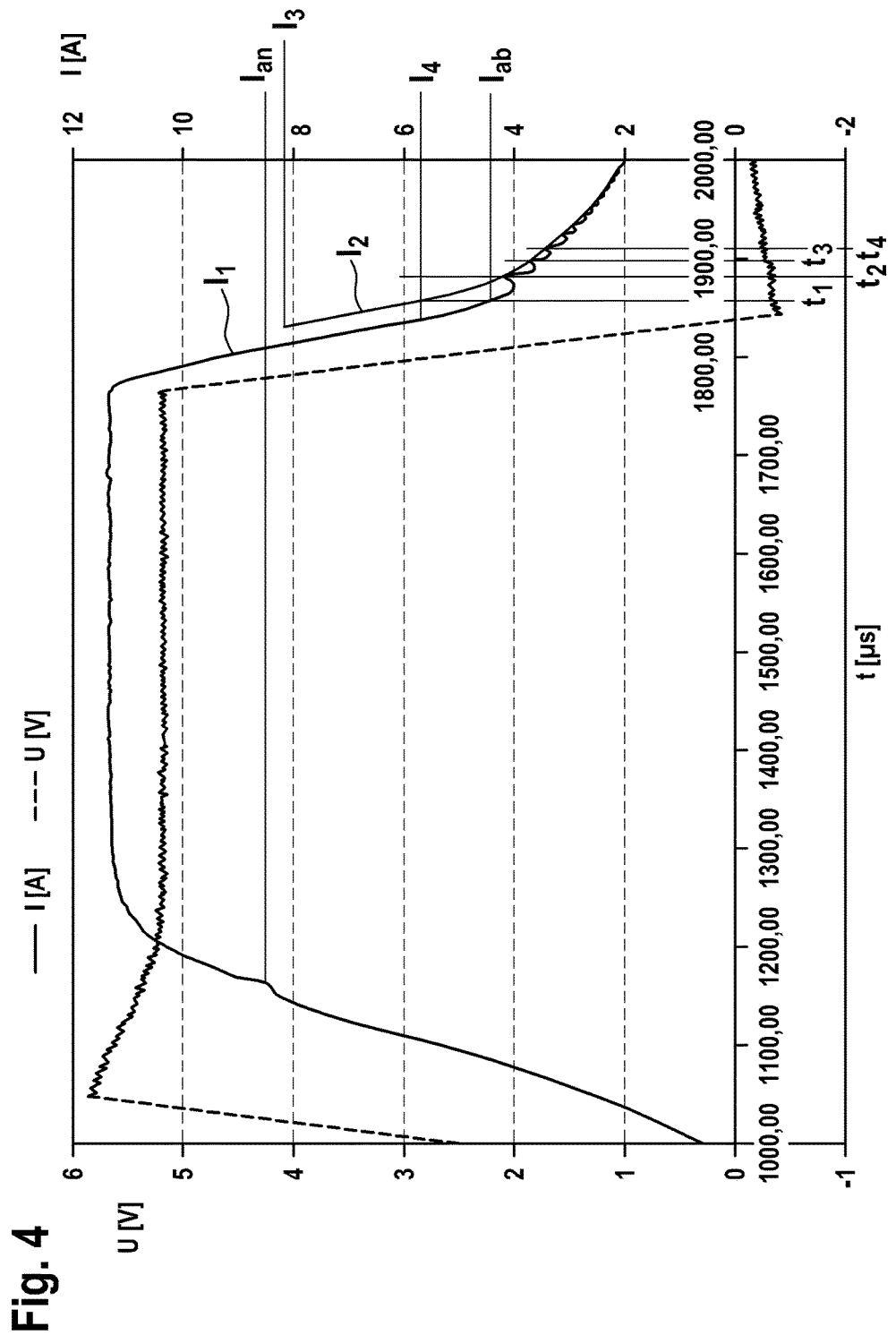
FIG. 4 shows the determination of the spring constant for the restoring force and the coefficient of friction for the valve actuation from the measured time course of the current through the switching magnet.

FIG. 4 clarifies the determination of the spring constant of the restoring force 4 as well as the determination of the coefficient of friction for the valve actuation using the measured data shown in FIG. 3. $t_1$ denotes here the point in time at which the rotor 2 began the movement thereof in the direction of the closed position; this point in time can be seen by means of a small control deviation in the current curve U. The rotor 2 struck in each case the end position thereof at the points in time $t_2$, $t_3$, and $t_4$. The information regarding the spring constant of the valve spring 4 is contained in the time difference between the points in time $t_1$, $t_2$, $t_3$, and $t_4$. The coefficient of friction for the valve actuation lies in the decrease of the amplitude in the current curve $I_1$ between the individual maxima at the points in time $t_2$, $t_3$ and $t_4$.

The invention claimed is:

1. A method for determining a characteristic value of a magnetic switch valve, which can be switched from a first switch state into a second switch state by movement of a rotor by means of a switching magnet to which current is applied, against a conservative restoring force, wherein the first switch state is either a closed switch state or an open switch state and the second switch state is the open switch state when the first switch state is the closed switch state or the closed switch state when the first switch state it the open switch state and wherein the characteristic value belongs to a group, comprising:
    the time required for switching the switch valve from the first switch state into the second switch state,
    the spring constant of the restoring force,
    the coefficient of friction effective during the valve actuation, and the switching path, which the rotor covers when switching between the first and the second state, characterized in that during the switching of the switch valve from the second into the first state, the time course of the current flowing through the switching magnet and/or of the voltage at the switching magnet is measured, and the characteristic value is determined from this time course, using a temporal attenuation course with which an energy stored in the magnetic circuit formed by the rotor and the switching magnet, in the case of the position of the rotor fixed in the second and/or first state, is dissipated, wherein the energy stored is evaluated as an integral over the temporal attenuation course for the second state between a first point in time, at which the rotor begins to move by means of the restoring force when switching from the second into the first state, and a second point in time, at which the rotor first strikes the end position thereof.

2. The method according to claim 1, characterized in that, during the switching of the switch valve from the second into the first state, the time course of the current flowing through the switching magnet and/or of the voltage at the switching magnet is measured while controlling the voltage at the switching magnet to a constant value.

3. The method according to claim 1, characterized in that additionally the time course of the current when switching from the first to the second state, and/or the current required for switching the valve from the first state into the second state and/or the voltage required for this switching, and/or the ohmic resistance of the switching magnet, and/or the time course of the voltage when switching from the first into the second state and/or from the second into the first state is measured and used for determining the characteristic value.

4. The method according to claim 1, characterized in that, during the switching from the first into the second state by means of the mechanical work against the restoring force, stored potential energy, which is converted into electric energy when switching from the second into the first state by means of the movement of the rotor against the switching magnet and is dissipated at the ohmic resistor thereof, is evaluated from the time course of the current and/or the voltage.

5. The method according to claim 1, characterized in that the attenuation course is determined under the boundary condition that the switching magnet is short-circuited or in that the voltage at the switching magnet is controlled to a constant value.

6. The method according to claim 1, characterized in that the attenuation course is determined by an extrapolation of the time course of the current and/or the voltage on the basis of the time period in which the application of current to the switching magnet has already been interrupted but the rotor has not yet been set into motion by means of the restoring force, and/or by a curve fit at maxima, which have been induced in the current course and/or in the voltage course when switching into the first state by the repeated bouncing of the rotor at the end position thereof.

7. The method according to claim 1, characterized in that the attenuation course is determined from the temporal current response of the switching magnet to a voltage which is applied in the first state and which is not sufficient for switching into the second state.

8. The method according to claim 1, characterized in that the stored potential energy is evaluated as an integral over the measured current course and/or voltage course between a first point in time, at which the rotor begins to move by means of the restoring force when switching from the second into the first state, and a second point in time, at which the measured current course or respectively the measured voltage course has the same current value or respectively the same voltage value as the attenuation course for the first state at the first point in time.

9. The method according to claim 1, characterized in that the point in time at which the time course of the current and/or the voltage achieves a local maximum after the beginning of the switching from the second into the first state is evaluated as the point in time at which the rotor strikes the end position thereof.

10. The method according to claim 1, characterized in that that point in time at which the rotor hereby induces a voltage or respectively current signal in the switching magnet is evaluated as the point in time $t_1$ at which the rotor begins to move by means of the restoring force when switching from the second into the first state.

* * * * *